(12) United States Patent
Itagaki

(10) Patent No.: US 11,897,473 B2
(45) Date of Patent: Feb. 13, 2024

(54) DEVICE FOR TOWING VEHICLE AND METHOD OF CONTROLLING DEVICE FOR TOWING VEHICLE

(71) Applicant: TOYOTA JIDOSHA KABUSHIKI KAISHA, Toyota (JP)

(72) Inventor: Daisuke Itagaki, Kasugai (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/195,520

(22) Filed: May 10, 2023

(65) Prior Publication Data

US 2023/0415748 A1 Dec. 28, 2023

(30) Foreign Application Priority Data

Jun. 27, 2022 (JP) ................. 2022-102958

(51) Int. Cl.
*B60W 30/188* (2012.01)
*B60W 30/02* (2012.01)
(Continued)

(52) U.S. Cl.
CPC ....... *B60W 30/188* (2013.01); *B60W 2520/14* (2013.01); *B60W 2520/28* (2013.01); *B60W 2520/30* (2013.01); *B60W 2554/404* (2020.02)

(58) Field of Classification Search
CPC .. B60W 30/188; B60W 30/242; B60W 30/14; B60W 30/28; B60W 30/30; B60W 2554/404; B60W 10/20; B60W 10/04; B60W 10/22; B60W 30/02; B60W 2520/10; B60W 2520/105; B60W 2520/125; B60W 2520/18; B60W 2530/10; B60W 2530/22; B60W 2300/14; B60W 2510/0657; B60W 2510/105; B60W 2520/06; B60W 2520/22; B60W 2530/30; B60W 2530/203; B60D 1/62; B60D 1/248; B62D 5/046; B62D 13/005
See application file for complete search history.

(56) References Cited

U.S. PATENT DOCUMENTS 9,840,277 B1 * 12/2017 Beech ................... B60D 1/62
2019/0086204 A1 * 3/2019 Critchley ............ G01S 13/88
(Continued)

FOREIGN PATENT DOCUMENTS

DE 102015009149 A1 * 1/2017
JP 2020-001473 A 1/2020

*Primary Examiner* — Tinh Dang
(74) *Attorney, Agent, or Firm* — Sughrue Mion, PLLC

(57) ABSTRACT

A device for a towing vehicle that includes: a drive unit that independently drives each of left and right wheels of a towing vehicle that tows a towed vehicle; an acceleration detection unit that detects an acceleration of the towing vehicle; a drive force detection unit that detects a drive force of the towing vehicle; a mass estimation unit that estimates a mass of the towed vehicle using respective detection results generated by the acceleration detection unit and the drive force detection unit at a time of acceleration of the towing vehicle in a towing state; and a control unit that controls a drive force of the left and right wheels of the towing vehicle in consideration of an influence of the mass of the towed vehicle estimated by the mass estimation unit at a time of turning of the towing vehicle in the towing state.

4 Claims, 8 Drawing Sheets

(51) Int. Cl.
 *B60W 10/20* (2006.01)
 *B60W 10/04* (2006.01)
 *B60W 10/105* (2012.01)
 *B62D 5/04* (2006.01)

(56) References Cited

U.S. PATENT DOCUMENTS

2019/0283513 A1\* 9/2019 Shepard ............... B62D 15/029
2020/0010076 A1\* 1/2020 Yamamoto ............... B60R 1/00
2021/0214004 A1 7/2021 Seto et al.

\* cited by examiner

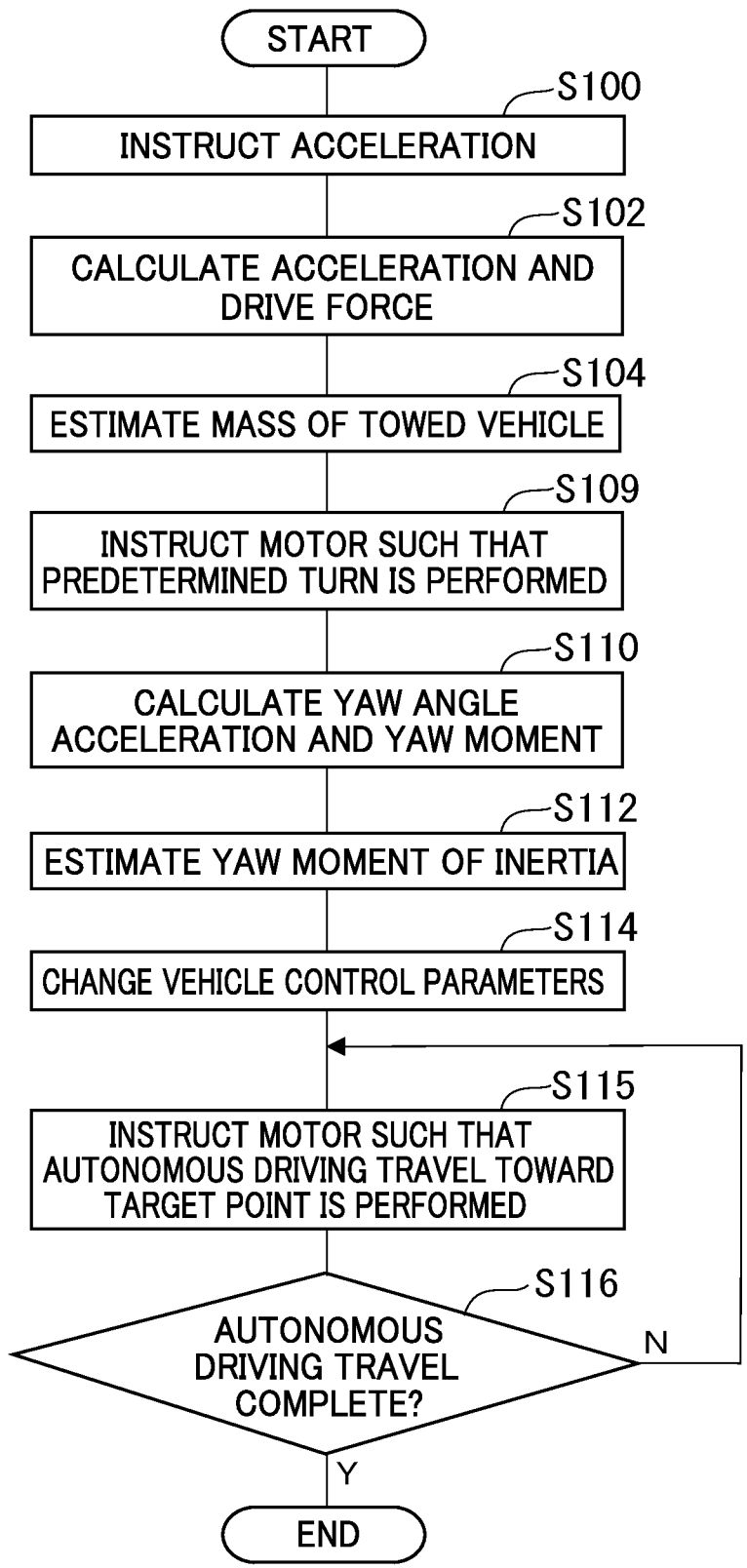

DEVICE FOR TOWING VEHICLE AND METHOD OF CONTROLLING DEVICE FOR TOWING VEHICLE

CROSS-REFERENCE TO RELATED APPLICATION

This application is based on and claims priority under 35 USC 119 from Japanese Patent Application No. 2022-102958 filed on Jun. 27, 2022, the disclosure of which is incorporated by reference herein.

BACKGROUND

Technical Field

The present disclosure relates to a device for a towing vehicle and a method of controlling the device for a towing vehicle.

Related Art

Japanese Patent Application Laid-Open No. 2020-1473 discloses a technique relating to a vehicle control device installed in a tractor (towing vehicle) that tows a trailer (towed vehicle). To explain in brief, in this conventional technique, a steering angle control section that controls the steering angle of the wheels of the tractor independently of steering by a driver, and a trailer characteristic estimation section that estimates trailer characteristics based on the behavior of the tractor during wheel steering by the steering angle control section, are included. Namely, in this conventional technique, the trailer characteristics are estimated from the behavior of the tractor when the steering of the wheels of the tractor is controlled. Here, using these estimation results enables the towing travel of the tractor to be stabilized.

However, Japanese Patent Application Laid-Open No. 2020-1473 presupposes that a tractor has a steering mechanism, and does not apply to cases in which there is no steering mechanism in a towing vehicle.

SUMMARY

In consideration of the foregoing circumstances, it is an object of the present disclosure to obtain a towing vehicle device and a control method for the towing vehicle device that are capable of improving the stability of towing travel by a towing vehicle even in the case of a configuration in which a towing vehicle without a steering mechanism tows a towed vehicle.

A device for a towing vehicle of a first aspect of the disclosure includes a drive unit capable of independently driving each of left and right wheels of a towing vehicle that tows a towed vehicle; an acceleration detection unit configured to detect an acceleration of the towing vehicle; a drive force detection unit configured to detect a drive force of the towing vehicle; a mass estimation unit configured to estimate a mass of the towed vehicle using respective detection results generated by the acceleration detection unit and the drive force detection unit at a time of acceleration of the towing vehicle in a towing state; and a control unit configured to control a drive force of the left and right wheels of the towing vehicle in consideration of an influence of the mass of the towed vehicle estimated by the mass estimation unit at a time of turning of the towing vehicle in the towing state.

Here, the "mass of the towed vehicle" in the first aspect of the disclosure refers to the mass of the towed vehicle in a state in which an object or the like is mounted on the towed vehicle, in cases in which an object or the like is mounted on the towed vehicle (the same applies in the present specification).

According to the configuration described above, the drive unit is capable of independently driving each of the left and right wheels of the towing vehicle that tows the towed vehicle. Further, the acceleration detection unit detects the acceleration of the towing vehicle, and the drive force detection unit detects the drive force of the towing vehicle. Moreover, the mass estimation unit estimates the mass of the towed vehicle using the respective detection results from the acceleration detection unit and the drive force detection unit during acceleration of the towed vehicle in the towed state. In addition, the control unit controls the drive force of the left and right wheels of the towing vehicle in consideration of the influence of the mass of the towed vehicle estimated by the mass estimation unit when the towing vehicle turns in the towing state. This enables the towing travel of the towing vehicle to be stabilized regardless of the mass of the towed vehicle.

A device for a towing vehicle of a second aspect of the disclosure includes, in the configuration of the first aspect, a wheel speed sensor configured to detect respective wheel speeds of the towing vehicle; and a torque sensor configured to detect torque of the respective wheels of the towing vehicle, in which: the drive unit is configured as a motor, the acceleration detection unit detects the acceleration of the towing vehicle using a detection result of the wheel speed sensor, and the drive force detection unit detects the drive force of the towing vehicle using a detection result of the torque sensor.

According to the configuration described above, the drive unit is a motor, and the wheel speed sensor detects respective wheel speeds of the towing vehicle, and the torque sensor detects the torque of each wheel of the towing vehicle. Moreover, the acceleration detection unit detects the acceleration of the towing vehicle using the detection results of the wheel speed sensor, and the drive force detection unit detects the drive force of each wheel of the towing vehicle using the detection results of the torque sensor. For this reason, in cases in which a wheel speed sensor and a torque sensor are installed for control of the motor, the acceleration of the towing vehicle and the drive force of the wheels of the towing vehicle can be detected without adding any new sensor, which enables the towing travel of the towing vehicle to be stabilized.

A device for a towing vehicle of a third aspect of the disclosure includes, in the configuration of the second aspect, a yaw moment of inertia estimation unit configured to estimate a yaw moment of inertia of the towing vehicle in the towing state using respective detection results generated by the wheel speed sensor and the torque sensor when the towing vehicle in the towing state begins to turn, in which the control unit further controls the drive force of the left and right wheels of the towing vehicle in consideration of an influence of the yaw moment of inertia estimated by the yaw moment of inertia estimation unit at a time of turning of the towing vehicle in the towing state.

According to the configuration described above, the yaw moment of inertia estimation unit uses the respective detection results of the wheel speed sensor and the torque sensor at the start of turning of the towing vehicle in the towed state to estimate the yaw moment of inertia of the towing vehicle in the towing state. Moreover, the control unit controls the drive force of the left and right wheels of the towing vehicle during turning of the towing vehicle in the towing state, in consideration of the influence of the yaw moment of inertia estimated by the yaw moment estimation unit. This enables the stability of the towing travel of the towing vehicle to be further improved without adding a new sensor.

A method of controlling a device for a towing vehicle of a fourth aspect of the present disclosure includes: providing a device for a towing vehicle, the device including: a drive unit capable of independently driving each of left and right wheels of a towing vehicle that tows a towed vehicle; an acceleration detection unit configured to detect an acceleration of the towing vehicle; a drive force detection unit configured to detect a drive force of the towing vehicle; estimating a mass of the towed vehicle using respective detection results generated by the acceleration detection unit and the drive force detection unit at a time of acceleration of the towing vehicle in a towing state; and controlling a drive force of the left and right wheels of the towing vehicle in consideration of an influence of the estimated mass of the towed vehicle at a time of turning of the towing vehicle in the towing state. This enables the towing travel of the towing vehicle to be stabilized regardless of the mass of the towed vehicle, similarly to the disclosure recited in claim 1.

As described above, according to the present disclosure, the excellent advantageous effect is realized of enabling the stability of towing travel of a towing vehicle to be improved even in the case of a configuration in which a towing vehicle without a steering mechanism tows a towed vehicle.

BRIEF DESCRIPTION OF THE DRAWINGS

Exemplary embodiments of the present invention will be described in detail based on the following figures, wherein:

FIG. 8 is a flowchart illustrating an example of a flow of control processing of autonomous driving travel performed by an ECU of a towing vehicle device of a second exemplary embodiment.

DETAILED DESCRIPTION

First Exemplary Embodiment

Explanation follows regarding a towing vehicle device and a control method for the towing vehicle device according to a first exemplary embodiment of the present disclosure, with reference to the drawings.

Figure 1:
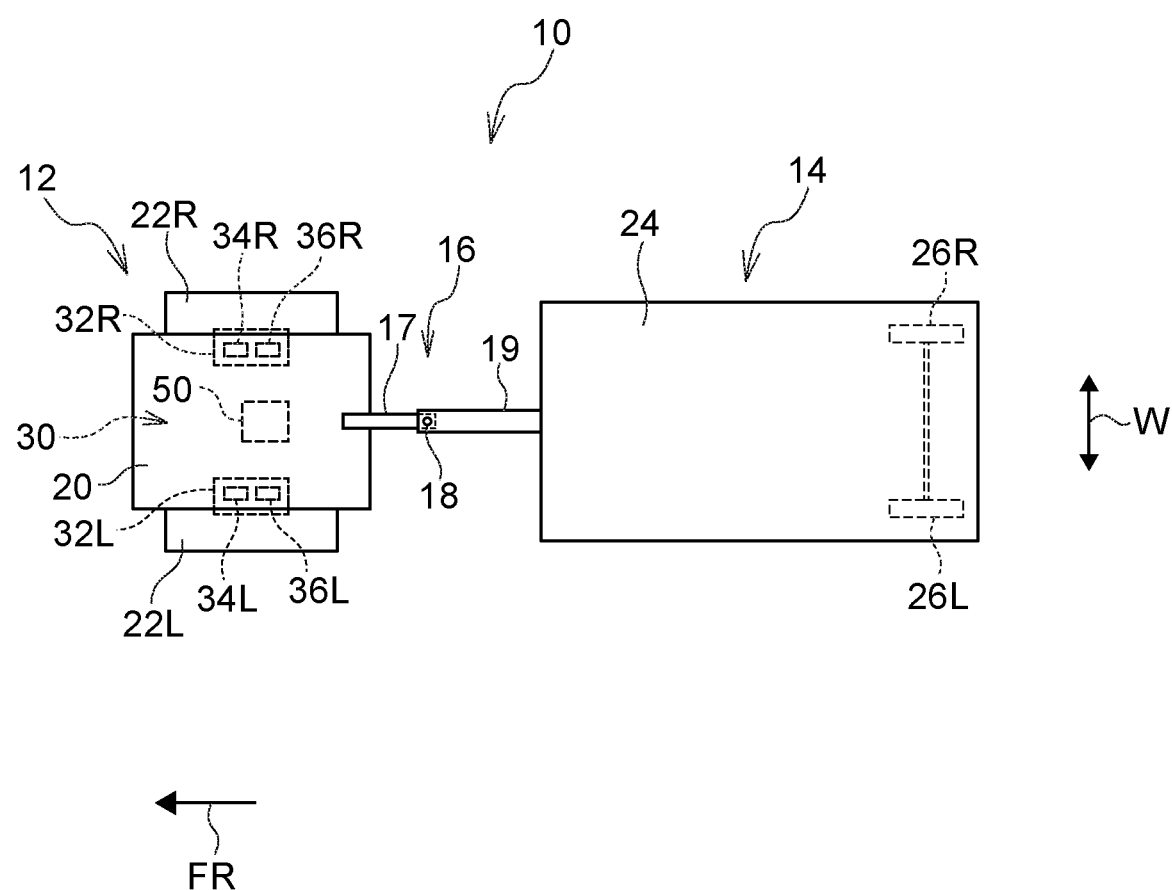
FIG. 1 is a simplified plan view illustrating a schematic configuration of a coupled vehicle including a towing vehicle installed with a towing vehicle device according to a first exemplary embodiment.

FIG. 1 is a simplified plan view illustrating a schematic configuration of a coupled vehicle 10 including a towing vehicle 12 installed with a towing vehicle device 30 according to the present exemplary embodiment. The arrow FR illustrated in FIG. 1 indicates a front side of the vehicle (similarly in FIG. 2), and the arrow W indicates a vehicle width direction. As illustrated in FIG. 1, in the coupled vehicle 10, the towing vehicle 12 tows a towed vehicle 14. The towing vehicle 12 is also referred to as a towing mobility.

Figure 2:
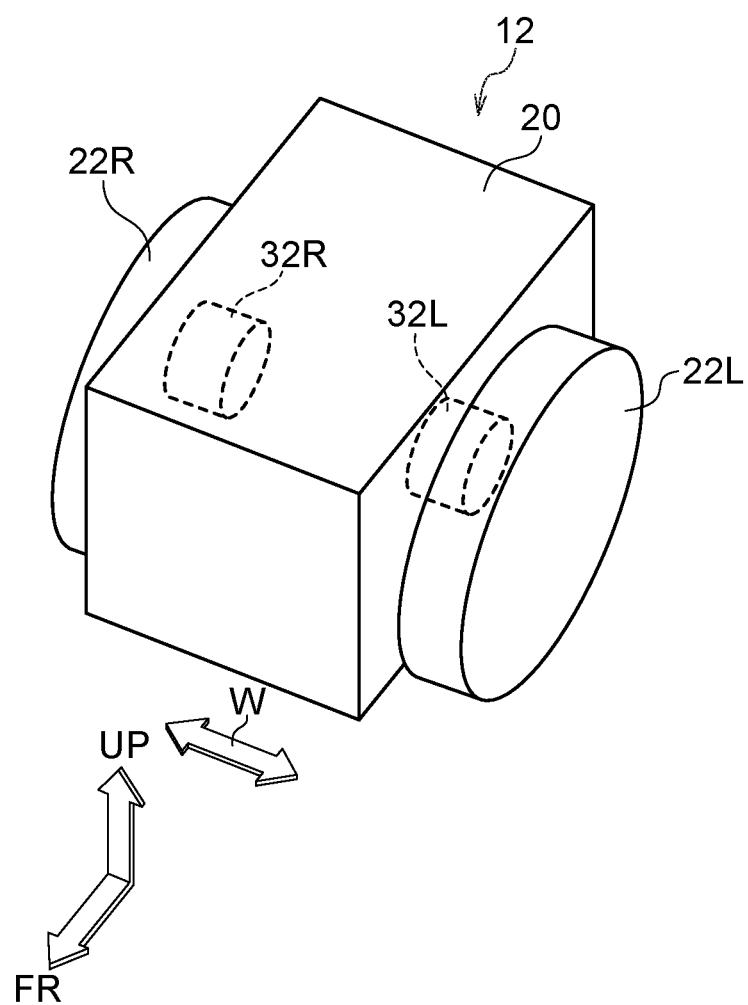
FIG. 2 is a simplified perspective view of the towing vehicle of FIG. 1.

FIG. 2 is a simplified perspective view of the towing vehicle 12. The arrow UP illustrated in FIG. 2 indicates an upper side of the vehicle. The towing vehicle 12 illustrated in FIG. 1 and FIG. 2 is an autonomous driving vehicle and, as an example, is used for travel inside a factory to transport components and the like. The towing vehicle 12 includes a vehicle body 20 and wheels 22L, 22R disposed at the left and right of the vehicle body 20, and does not include a steering mechanism. The left and right wheels 22L, 22R are independently rotatable drive wheels, and are configured such that their angle with respect to the vehicle body 20 in plan view cannot be changed.

Moreover, the towing vehicle 12 is provided with motors 32L, 32R (elements that are understood in a broad sense as "drive devices") serving as drive units capable of independently driving the respective left and right wheels 22L, 22R of the towing vehicle 12. The motors 32L, 32R are configured to be capable of outputting torque. The left motor 32L is provided for the left wheel 22L, enabling the left wheel 22L to be driven in a forward rotation direction and a reverse rotation direction, and the right motor 32R is provided for the right wheel 22R, enabling the right wheel 22R to be driven in a forward rotation direction and a reverse rotation direction. The left and right motors 32L, 32R are independently controllable, and a turning operation of the towing vehicle 12 is controllable by applying a difference in torque between the left and right motors 32L, 32R. Braking and driving operations of the towing vehicle 12 can be controlled by changing the rotational speed of the motors 32L, 32R.

Further, as illustrated in FIG. 1, the towing vehicle 12 is provided with wheel speed sensors 34L, 34R (illustrated in block form in FIG. 1) that detect respective wheel speeds (rotational speeds of the respective wheels 22L, 22R) of the towing vehicle 12. The left wheel speed sensor 34L detects the rotational speed of the left wheel 22L, and the right wheel speed sensor 34R detects the rotational speed of the right wheel 22R. Moreover, the towing vehicle 12 is provided with torque sensors 36L, 36R (illustrated in block form in FIG. 1) that detect torques of the respective wheels 22L, 22R of the towing vehicle 12. The left torque sensor 36L detects the torque of the left wheel 22L, and the right torque sensor 36R detects the torque of the right wheel 22R. The detected values of the torques of the respective wheels 22L, 22R of the towing vehicle 12 may be detected by calculation from the current values of the motors 32L, 32R.

As illustrated in FIG. 1, the towed vehicle 14 connected to the towing vehicle 12 includes a cargo bed 24 and wheels 26L, 26R disposed at the left and right of the cargo bed 24. In FIG. 1, as an example, the wheels 26L, 26R are disposed only on the left and right sides of the rear section of the cargo bed 24, but may be similarly provided on the left and right sides of the front section of the cargo bed 24. The towed vehicle 14 is also referred to as a cart, a trailer, or the like.

A connecting section 16 between the towing vehicle 12 and the towed vehicle 14 includes a hitch 17 provided on the side of the towing vehicle 12, a bracket 19 provided on the side of the towed vehicle 14, and a connecting shaft 18 connecting the hitch 17 and the bracket 19. As an example, the hitch 17 and the connecting shaft 18 are part of the towing vehicle 12, and the bracket 19 is part of the towed vehicle 14. The hitch 17 is fixed to a central portion in the vehicle width direction at a rear end portion of the vehicle body 20 of the towing vehicle 12, and extends rearward of the vehicle body. The bracket 19 is fixed to a central portion in the vehicle width direction at a front end portion of the cargo bed 24 of the towed vehicle 14, and extends forward of the vehicle body. The connecting shaft 18 is disposed at a rear end portion of the hitch 17 so as to be axially oriented in a vertical direction, and connects the hitch 17 and the bracket 19 so as to be rotatable about an axis in a vertical direction.

Figure 3:
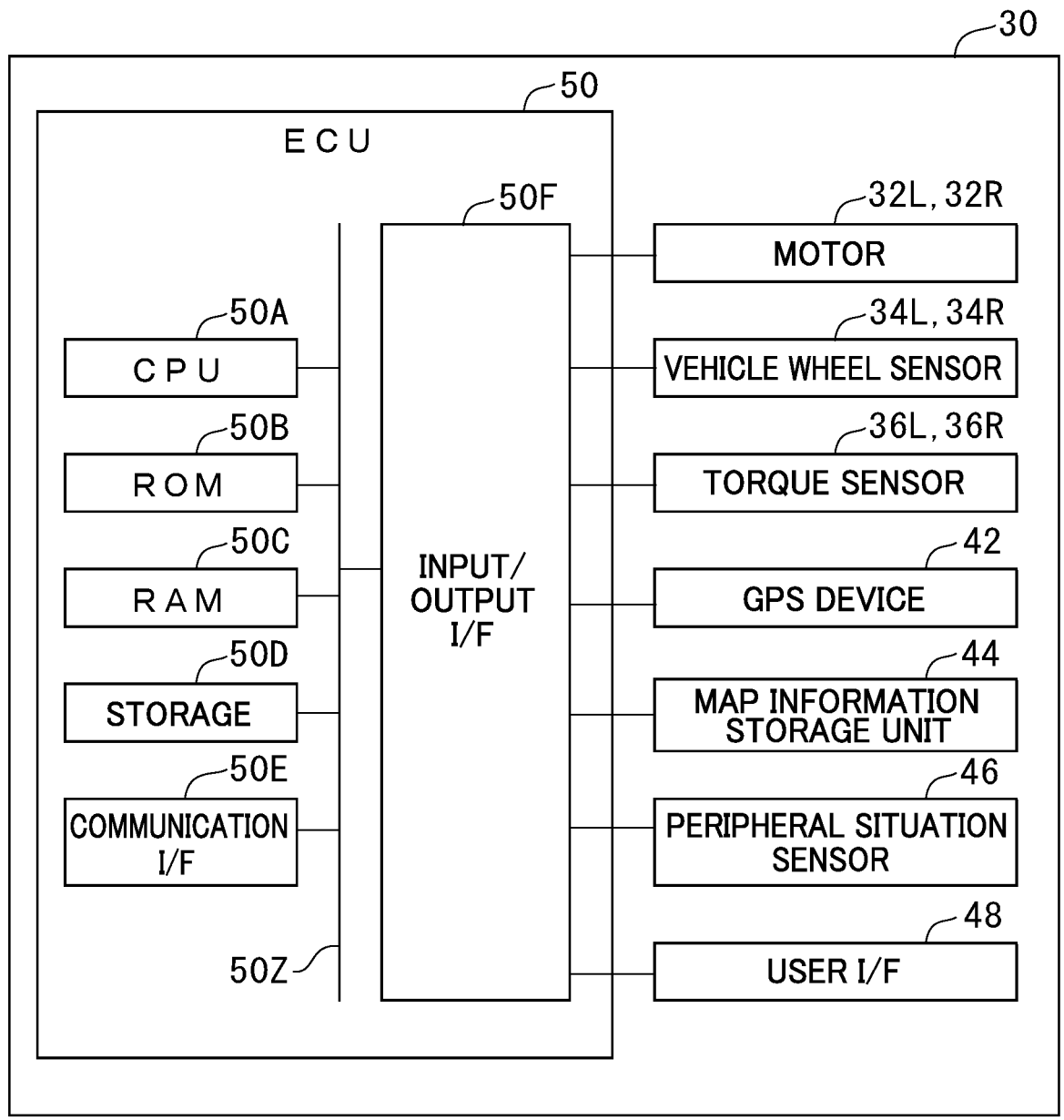
FIG. 3 is a block diagram illustrating an example of a hardware configuration of the towing vehicle device of FIG. 1.

FIG. 3 is a block diagram illustrating an example of a hardware configuration of the towing vehicle device 30 according to the present exemplary embodiment. As illustrated in FIG. 3, the towing vehicle device 30 includes the motors 32L, 32R, the wheel speed sensors 34L, 34R, and the torque sensors 36L, 36R described above, as well as a global positioning system (GPS) device 42, a map information storage unit 44, a peripheral situation sensor 46, a user interface (abbreviated as "user I/F" in FIG. 3), and an electrical control unit (ECU) 50.

The GPS device 42 acquires the current position of the towing vehicle 12. The map information storage unit 44 stores a map database. The peripheral situation sensor 46 detects a peripheral situation around the coupled vehicle 10. The peripheral situation sensor 46 includes, for example, a radar that detects a preceding vehicle or the like traveling ahead of the travel direction of the towing vehicle 12, and a camera that captures peripheral information for the coupled vehicle 10.

The user interface 48 is an interface for when a user uses the towing vehicle device 30. The user interface 48 includes, for example, at least one of a liquid crystal display including a touch panel that enables a user to perform touch operation, or a speech input receiving unit that receives speech input by the user.

The ECU 50 performs travel control processing during autonomous driving that causes the towing vehicle 12 to travel automatically. In FIG. 1, the ECU 50 is illustrated in block form. As illustrated in FIG. 3, the ECU 50 includes a central processing unit (CPU; serving as a processor) 50A, read only memory (ROM) 50B, random access memory (RAM) 50C, storage 50D, a communication interface (abbreviated as "communication I/F" in FIG. 3), and an input/output interface (abbreviated as "input/output I/F" in FIG. 3) 50F. The CPU 50A, the ROM 50B, the RAM 50C, the storage 50D, the communication interface 50E, and the input/output interface 50F are connected so as to be capable of communicating with each other via a bus 50Z.

The CPU 50A is a central processing unit that executes various programs and controls various units. Namely, the CPU 50A reads a program from the ROM 50B or the storage 50D, and executes the program using the RAM 50C as a workspace. The CPU 50A controls the respective configurations and performs various computation processing according to a program recorded in the ROM 50B or the storage 50D.

The ROM 50B stores various programs and various data. The RAM 50C serves as a workspace to temporarily store programs and data. The storage 50D is configured by a hard disk drive (HDD), a solid state drive (SSD), or the like, and holds various programs and various data. In the present exemplary embodiment, the ROM 50B or the storage 50D stores a travel control program for autonomous driving, and stores the mass of the towing vehicle 12. Moreover, predetermined parameters for vehicle control (such as the mass of the towed vehicle 14, the yaw moment of inertia of the towing vehicle 12 in the towing state, and the like) are stored in the storage 50D.

Supplementary explanation follows regarding the predetermined parameters for vehicle control. For example, in a case in which a travel objective is to be implemented using the motors 32L, 32R, the current values required by the motors 32L, 32R vary depending on, for example, the mass of the towed vehicle 14 and the yaw moment of inertia of the towed vehicle 12 in the towing state. Accordingly, in the present exemplary embodiment, in order to calculate the current values required for the motors 32L, 32R, the mass of the towed vehicle 14 and the yaw moment of inertia of the towing vehicle 12 in the towing state, for example, are stored in the storage 50D so as to be updatable as parameters. At the time at which the towing vehicle 12 is delivered to the user, as an example, provisional initial values are set in the parameters.

The communication interface 50E is an interface for communicating with other devices, such as a portable terminal (not illustrated). For example, a wireless communication protocol such as 4G, 5G, or Wi-Fi (registered trademark) is used for this communication.

The input/output interface 50F is an interface for communicating with the respective devices installed in the towing vehicle 12. The ECU 50 of the present exemplary embodiment is connected through the input/output interface 50F to, for example, motors 32L, 32R, wheel speed sensors 34L, 34R, torque sensors 36L, 36R, the GPS device 42, the map information storage unit 44, the peripheral situation sensor 46, and the user interface 48. The motors 32L, 32R, the wheel speed sensors 34L, 34R, the torque sensors 36L, 36R, the GPS device 42, the map information storage unit 44, the peripheral situation sensor 46, and the user interface 48 may be directly connected to the bus 50Z.

Figure 4:
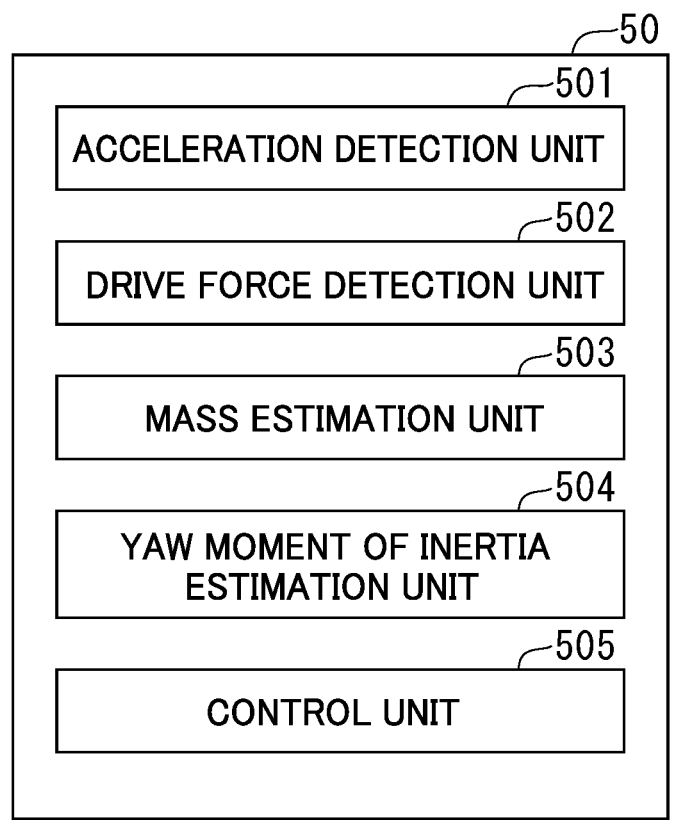
FIG. 4 is a block diagram illustrating an example of a functional configuration of an ECU of the towing vehicle device of FIG. 1.

FIG. 4 is a block diagram illustrating an example of a functional configuration of the ECU 50. As illustrated in FIG. 4, the ECU 50 includes functional configuration including an acceleration detection unit 501, a drive force detection unit 502, a mass estimation unit 503, a yaw moment of inertia estimation unit 504, and a control unit 505. The respective functional configurations are implemented by the CPU 50A reading and executing a program (the autonomous driving travel control program described above) stored in the ROM 50B or the storage 50D.

The acceleration detection unit 501 detects an acceleration a of the towing vehicle 12. The acceleration detection unit 501 of the present exemplary embodiment detects the acceleration a of the towing vehicle 12 using the detection results of the wheel speed sensors 34L, 34R. To explain further, as an example, the acceleration detection unit 501 calculates an average wheel speed w of the left and right wheels from the detection results of the wheel speed sensors 34L, 34R, multiplies this wheel speed w by the tire radius R to calculate the vehicle speed V, and differentiates this vehicle speed V to calculate (detect) the acceleration a. The tire radius R refers to the dynamic load radius of the wheels 22L, 22R. The tire radius R of the wheels 22L, 22R is the same on the left and right sides, and is stored in advance in the ROM 50B or the storage 50D.

The drive force detection unit 502 detects a drive force F of the towing vehicle 12. The drive force detection unit 502 of the present exemplary embodiment detects the drive force F of the towing vehicle 12 using the detection results of the torque sensors 36L, 36R. To explain further, the drive force detection unit 502 calculates (detects) the drive force F by, as an example, dividing the total value Tm obtained by adding the detection value TL from the left torque sensor 36 L and the detection value TR from the right torque sensor 36 R, by the tire radius R of the wheels 22L, 22R.

The mass estimation unit 503 estimates the mass $m_2$ of the towed vehicle 14 using the respective detection results from the acceleration detection unit 501 and the drive force detection unit 502 during acceleration of the towed vehicle 12 in a towing state. Namely, the mass estimation unit 503 calculates the mass m of the coupled vehicle 10 from the relational expression F=ma using the acceleration a and the drive force F, and the mass $m_2$ of the towed vehicle 14 is estimated by subtracting the mass $m_1$ of the towing vehicle 12 from the mass m of the coupled vehicle 10. The mass of the towed vehicle 14 is one of the parameters for vehicle control, and the mass $m_2$ of the towed vehicle 14 estimated by the mass estimation unit 503 is stored in the storage 50D.

The yaw moment of inertia estimation unit 504, using the respective detection results of the wheel speed sensors 34L, 34R and the torque sensors 36L, 36R at the start of turning of the towing vehicle 12 in the towing state (when the towing vehicle 12 in the towing state starts turning from straight travel), estimates the yaw moment of inertia I of the towing vehicle 12 in the towing state. To explain further, the yaw moment of inertia estimation unit 504, as an example, when turning of the towing vehicle 12 in the towing state is started, calculates a yaw angle acceleration YR_dot using the detection results of the wheel speed sensors 34L, 34R, calculates the yaw moment (torque around the center of gravity of the towing vehicle 12) T of the towing vehicle 12 using the detection results of the torque sensors 36L, 36R, and estimates the yaw inertia moment I of the towing vehicle 12 in the towing state from the yaw angle acceleration YR_dot and the yaw moment T. The yaw moment of inertia of the towing vehicle 12 in the towing state is one of the parameters of vehicle control, and the yaw moment of inertia I of the towing vehicle 12 in the towing state estimated by the mass estimation unit 503 is stored in the storage 50D.

The control unit 505, at a time of turning of the towing vehicle 12 in the towing state, controls the drive force of the left and right wheels 22L, 22R of the towing vehicle 12 in consideration of the influence of the mass $m_2$ of the towed vehicle 14 estimated by the mass estimation unit 503. Moreover, the control unit 505, at a time of turning of the towing vehicle 12 in the towing state, controls the drive force of the left and right wheels 22L, 22R of the towing vehicle 12 in further consideration of the influence of the yaw moment of inertia I estimated by the yaw moment of inertia estimation unit 504.

Mechanism and Effect

Next, explanation is given regarding operation of the towing vehicle device 30.

Figure 5:
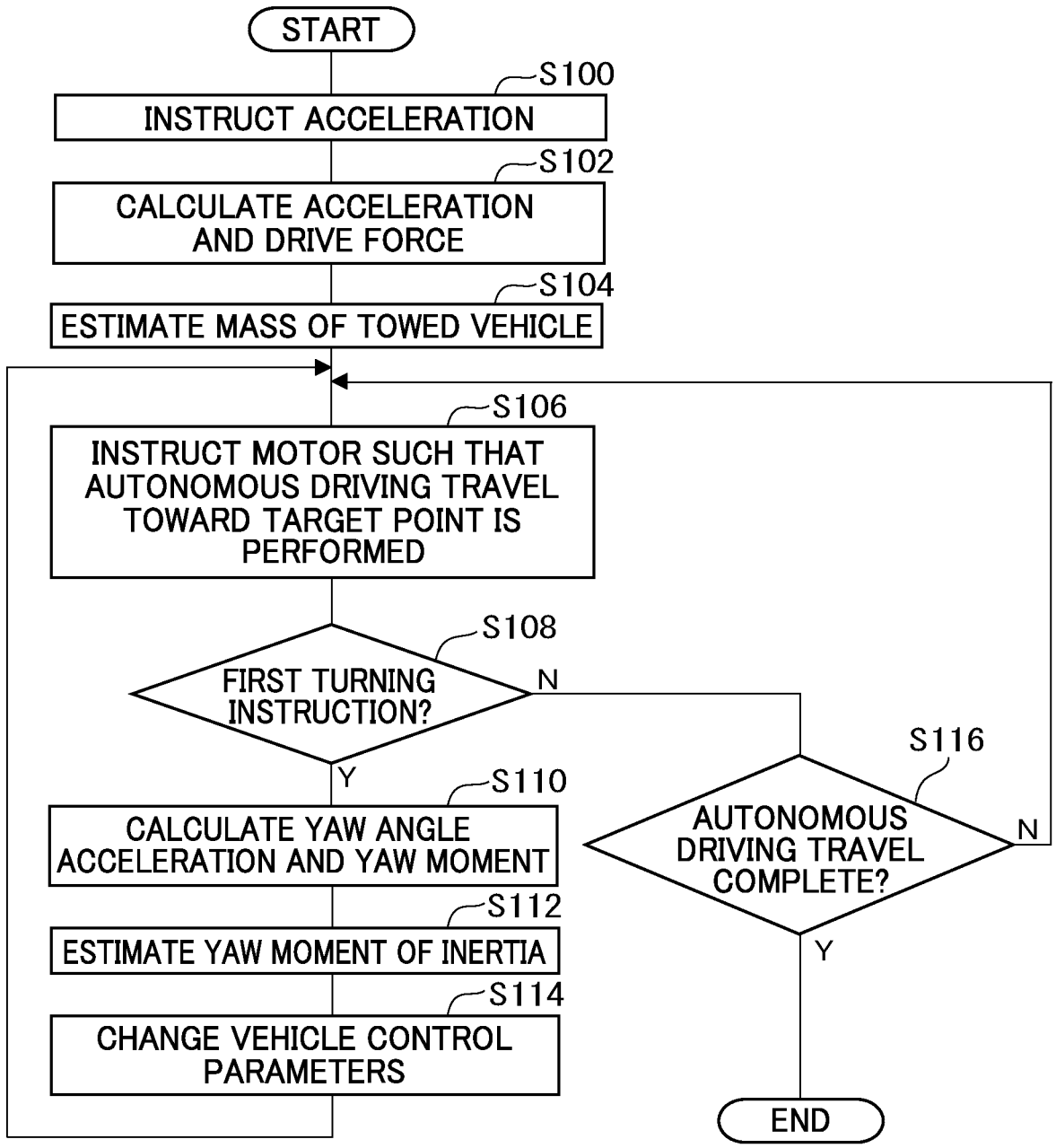
FIG. 5 is a flowchart illustrating an example of a flow of travel control processing performed by the ECU of the towing vehicle device of FIG. 1 during autonomous driving.

FIG. 5 is a flowchart illustrating an example of a flow of travel control processing performed by the ECU 50 during autonomous driving. The CPU 50A reads the autonomous driving travel control program from the ROM 50B or the storage 50D and opens and executes the program in the RAM 50C, whereby the travel control processing for autonomous driving is performed by the ECU 50. For example, in a case in which the ECU 50 receives a command to start autonomous driving of the towing vehicle 12, execution of the travel control processing for autonomous driving illustrated in FIG. 5 is initiated.

Figure 6:
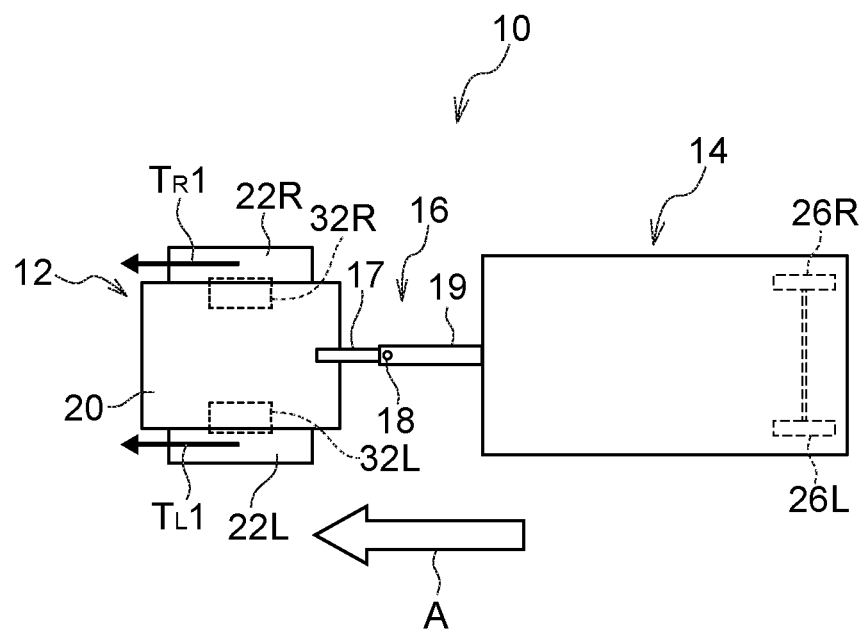
FIG. 6 is a schematic plan view illustrating the coupled vehicle when the towing vehicle of FIG. 1 is accelerating.

First, the CPU 50A instructs the motors 32L, 32R to propel and accelerate the towing vehicle 12 at a target acceleration (see arrow A in FIG. 6) (step S100). Namely, the CPU 50A outputs a current instruction value corresponding to the target acceleration to the motors 32L, 32R. As a result, the motors 32L, 32R illustrated in FIG. 6 generate torques (see the arrows $T_R1$, $T_L1$) corresponding to the current instruction values.

Next, at step S102 illustrated in FIG. 5, the CPU 50A acquires wheel speed detection values from the wheel speed sensors 34L, 34R and calculates (detects) the acceleration a of the towing vehicle 12, acquires the detected values of the torques of the respective wheels 22L, 22R from the torque sensors 36L, 36R, and calculates (detects) the drive force F.

More specifically, at step S102, the CPU 50A calculates an average left and right wheel speed ω from the detection results of the wheel speed sensors 34L, 34R, calculates the vehicle body speed V by multiplying the wheel speed ω by the tire radius R, and calculates (detects) the acceleration a of the towing vehicle 12 by differentiating the vehicle speed V. Further, at step S102, the CPU 50A calculates (detects) the drive force F by dividing the total value Tm, which is the sum of the detection value TL from the left torque sensor 36L and the detection value TR from the right torque sensor 36R, by the tire radius R of the wheels 22L, 22R.

Next, the CPU 50A uses the acceleration a and the drive force F calculated at step S102 to calculate the mass m of the coupled vehicle 10 from the relational expression F=ma, and then, by subtracting the mass $m_1$ of the towing vehicle 12 from the mass m of the coupled vehicle 10, estimates the mass $m_2$ of the towed vehicle 14 (step S104). Here, the mass $m_2$ of the towed vehicle 14, in a case in which an object or the like is mounted on the towed vehicle 14, refers to the mass of the towed vehicle 14 in a state in which the object or the like is placed thereon.

Next, the CPU 50A instructs the motors 32L, 32R to perform autonomous driving travel toward the target point (step S106). At step S106, prior to instructing the motors 32L, 32R, as an example, current values required for the motors 32 L, 32 R are calculated using the parameters for vehicle control.

Next, the CPU 50A determines whether or not the instruction given to the motors 32L, 32R at step S106 is an instruction to turn for the first time (step S108). Here, "an instruction to turn" refers to an instruction given to the left and right motors 32L, 32R so as to generate a difference in drive force between the left and right wheels 22L, 22R of the towing vehicle 12 in accordance with a target turning path.

In cases in which the instruction to the motors 32L, 32R is not an instruction for a first turn (step S108: N), the CPU 50A transitions to the processing of step S116 (described below). In cases in which the instruction to the motors 32L, 32R is an instruction for a first turn (step S108: Y), when turning of the towing vehicle 12 in the towed state is started (when the towing vehicle 12 in the towed state starts turning from straight travel), the wheel speed detection values are acquired from the wheel speed sensors 34L, 34R and the yaw angle acceleration YR_dot is calculated (see arrow B in FIG. 7A and arrow C in FIG. 7B), and the detected values of the torques of the respective wheels 22L, 22R are acquired from the torque sensors 36L, 3 R, and the yaw moment T of the towing vehicle 12 is calculated (step S110). At a coupling portion (a portion coupled by the connecting shaft 18) between the hitch 17 and the bracket 19 in the connecting section 16 during operation of the yaw moment T, forces act in a direction transverse to the travel direction of the towing vehicle 12 (see arrow D in FIG. 7A and arrow E in FIG. 7B).

At step S110, the CPU 50A calculates the yaw angle acceleration YR_dot as follows. First, the CPU 50A calculates the travel speed VR of the right wheel 22R using the following equation (1) and calculates the travel speed VL of the left wheel 22L using the following equation (2).

travel speed $VR$ of right wheel 22R=right wheel speed $\omega r \times$tire radius $R$    Equation 1:

travel speed $VL$ of left wheel 22L=left wheel speed $\omega l \times$tire radius $R$    Equation 2:

Next, the CPU 50A calculates the yaw rate YR using the following equation (3).

yaw rate $YR$=(travel speed $VR$ of right wheel 22R−travel speed $VL$ of left wheel 22L)/tread    Equation 3:

Here, the tread is a distance (see symbol X in FIG. 7A) between the centers of the tire contact surfaces of the left and right wheels 22L, 22R.

Finally, the CPU 50A differentiates the yaw rate YR and calculates the yaw angle acceleration YR_dot.

At step S110, the CPU 50A calculates the yaw moment T of the towing vehicle 12 according to the following equation (4).

Figure 7A:
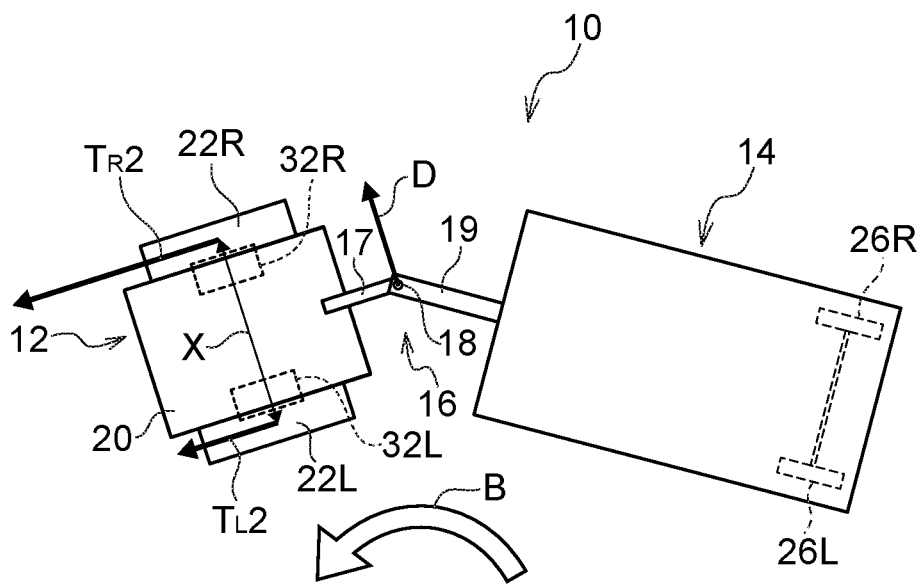
FIG. 7A is a schematic plan view illustrating the coupled vehicle when the towing vehicle of FIG. 1 is turning left.
Figure 7B:
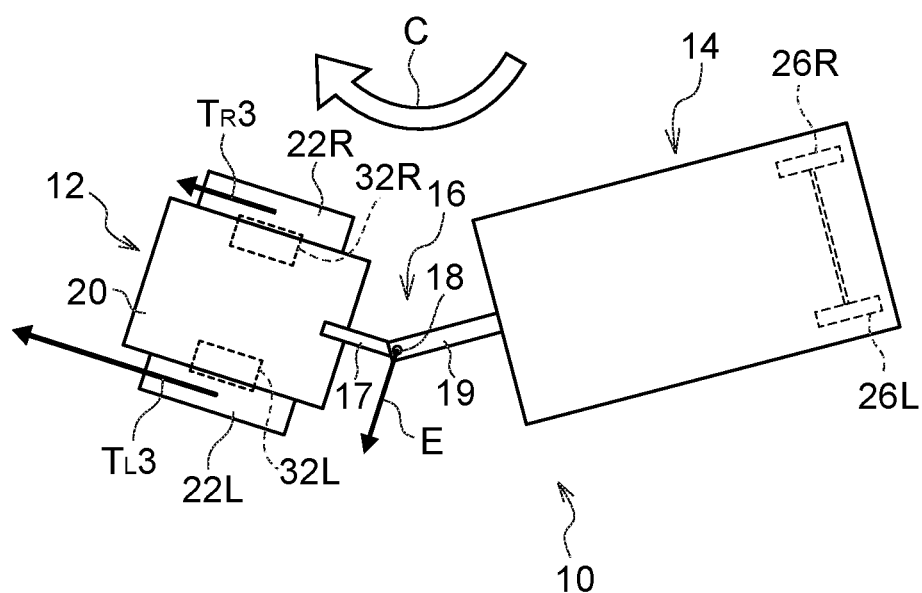
FIG. 7B is a schematic plan view illustrating the coupled vehicle when the towing vehicle of FIG. 1 is turning right.

$T$=(torque $TR$ of right wheel 22R/tire radius $R$)×tread/2−(torque $TL$ of left wheel 22L/tire radius $R$)×tread/2    Equation 4:

Refer to the arrow $T_R2$ in FIG. 7A and the arrow $T_R3$ in FIG. 7B for the torque TR of the right wheel 22R. Refer to the arrow $T_L2$ in FIG. 7A and the arrow $T_L3$ in FIG. 7B for the torque TL of the left wheel 22L.

Next, the CPU 50A, using the calculated values of the yaw angular acceleration YR_dot and the yaw moment T calculated at step S110, estimates the yaw inertia moment I of the towing vehicle 12 in the towing state from the following relationship (Equation 5) (step S112).

$T=I \times YR\_dot$    Equation 5:

Next, the CPU 50A, based on the weight $m_2$ of the towed vehicle 14 estimated at step S104 and the yaw inertial moment I of the towed vehicle 12 during the towing condition estimated at step S112, changes the parameters of the vehicle control (step S114). Namely, the respective values of the mass of the towed vehicle 14 and the yaw moment of inertia of the towing vehicle 12 in the towing state stored as parameters in the storage 50D are updated to the characteristic values respectively estimated at step S104 and step S112. After execution of the processing of step S114, the CPU 50A returns to step S106, and executes the processing of step S106 and the subsequent steps.

At step S116, the CPU 50A determines whether or not to end autonomous driving. The CPU 50A determines to end autonomous driving travel in a case in which, for example, the towing vehicle 12 has reached the destination. In cases in which the CPU 50A determines not to end autonomous driving (step S116: N), the CPU 50A repeats the processing from step S106 onward. In cases in which the CPU 50A determines to end autonomous driving (step S116: Y), the CPU 50A ends the processing based on the autonomous driving travel control program.

To explain further regarding the processing for autonomous driving travel at step S106 described above, when, for example, the towing vehicle 12 is turning in a towed state, the CPU 50A, using the vehicle control parameters, calculates the current values required for the motors 32L, 32R in consideration of the influence of the mass of the towed vehicle 14 and the influence of the yaw moment of inertia of the towing vehicle 12 in the towing state, and controls the drive force of the left and right wheels 22L, 22R of the towing vehicle 12.

As described above, according to the present exemplary embodiment, the drive force of the left and right wheels 22L, 22R of the towing vehicle 12 can be controlled in consideration of the influence of the mass of the towed vehicle 14 and the influence of the yaw moment of inertia of the towing vehicle 12 in the towing state. Therefore, according to the present exemplary embodiment, even in a configuration in which a towed vehicle 12 without a steering mechanism tows the towed vehicle 14, the stability of the towing travel of the towing vehicle 12 can be improved.

In the present exemplary embodiment, the weight $m_2$ of the towed vehicle 14 and the yaw inertial moment I of the towing vehicle 12 in the towing state are estimated using the wheel speed sensors 34L, 34R and the torque sensors 36L, 36R required to control the motors 32L, 32R.

For this reason, the towing travel of the towing vehicle 12 can be controlled according to the mass of the towed vehicle 14 and the yaw moment of inertia of the towing vehicle 12 in the towing state without adding new sensors that directly detect, for example, yaw rate or lateral acceleration.

Second Exemplary Embodiment

Next, explanation follows regarding a second exemplary embodiment, with reference to FIG. 8 while also referring back to FIG. 1 to FIG. 4. Since the hardware configuration of the towing vehicle device of the present exemplary embodiment is similar to the hardware configuration of the towing vehicle device 30 (see FIG. 3) of the first exemplary embodiment, FIG. 3 is referred back to, and detailed explanation thereof is omitted. Further, since the functional configuration of the ECU 50 (see FIG. 4) of the present exemplary embodiment is similar to the functional configuration of the ECU 50 of the first exemplary embodiment, FIG. 4 is referred back to, and detailed explanation thereof is omitted.

In the ROM 50B or the storage 50D of the present exemplary embodiment, instead of the autonomous driving travel control program described in the first exemplary embodiment, a control program for autonomous driving travel, which is another program, is stored. The control program for autonomous driving travel is a program including control of trial travel for parameter acquisition. In the present exemplary embodiment, by reading and executing the control program for autonomous driving travel stored in the ROM 50B or the storage 50D, the respective functional configurations of the acceleration detection unit 501, the drive force detection unit 502, the mass estimation unit 503, the yaw moment of inertia estimation unit 504, and the control unit 505 illustrated in FIG. 4 are implemented.

FIG. 8 illustrates a flowchart for an example of a flow of control processing for autonomous driving travel performed by the ECU 50 of the present exemplary embodiment. The CPU 50A reads the control program for autonomous driving travel from the ROM 50B or the storage 50D, and opens and executes the program in the RAM 50C, whereby the control processing for autonomous driving travel by the ECU 50 is performed. For example, in a case in which the ECU 50 receives a command to start autonomous driving travel of the towing vehicle 12 of the present exemplary embodiment, execution of the control processing for autonomous driving travel illustrated in FIG. 8 is started. In the flowchart illustrated in FIG. 8, steps that are basically the same as those in the flowchart of the first exemplary embodiment (see FIG. 5) are allocated the same step numbers, and explanation thereof is omitted as appropriate.

As illustrated in FIG. 8, firstly, the CPU 50A executes the respective processing of step S100, step S102, and step S104 in this order. Next, the CPU 50A instructs the motors 32L, 32R to perform a predetermined turn by the towing vehicle 12 (step S109). To explain further, the CPU 50A respectively instructs the left and right motors 32L, 32R to generate a difference in drive force between the left and right wheels 22L, 22R of the towing vehicle 12 according to a turning path set in advance for trial travel.

Next, the CPU 50A executes the respective processing of step S110, step S112, and step S114 in this order. Next, the CPU 50A instructs the motors 32L, 32R to perform autonomous driving travel toward the target point (step S115). While step S115 is similar to step S106 (see FIG. 5) of the first exemplary embodiment, different step numbers are allocated here for convenience.

Subsequently to step S115, the CPU 50A determines whether or not to end autonomous driving travel (step S116). In a case in which the CPU 50A determines not to end autonomous driving driving (step S116: N), the CPU 50A repeats the processing from step S115 onward. In a case in which the CPU 50A determines to end autonomous driving driving (step S116: Y), the CPU 50A ends the processing based on the control program for autonomous driving travel.

As described above, according to the second exemplary embodiment, the drive force of the left and right wheels 22L, 22R of the towing vehicle 12 can be controlled in consideration of the influence of the mass of the towed vehicle 14 and the influence of the yaw moment of inertia of the towing vehicle 12 in the towing state. Therefore, according to the second exemplary embodiment, even in a configuration in which a towed vehicle 12 without a steering mechanism tows the towed vehicle 14, the stability of the towing travel of the towing vehicle 12 can be improved. Moreover, according to the second exemplary embodiment, since vehicle control parameters can be acquired during a trial driving stage, the towing travel of the towing vehicle 12 when the towing vehicle 12 is autonomously driven toward the target point after the trial travel can be stabilized.

Supplementary Explanation of Exemplary Embodiments

As a modified example of the first and second exemplary embodiments illustrated in FIG. 1 to FIG. 8, the towing vehicle may be, for example, a vehicle that is switchable between autonomous driving and manual driving, and may have a configuration in which the vehicle control parameters are updated by estimating the mass $m_2$ of the towed vehicle 14 and the yaw moment of inertia I of the towed vehicle during manual driving of the towing vehicle.

In the first and second exemplary embodiments described above, although the towing vehicle 12 is intended to travel inside a factory and to be used to transport parts and the like, the towing vehicle may travel in an area other than a factory and be used to deliver goods and the like other than parts.

In the first and second exemplary embodiments described above, the towing vehicle 12 includes a total of two wheels 22L, 22R, one on each side; however, as a modified example of the first and second exemplary embodiments described above, the towing vehicle may have auxiliary wheels rearward of a center section in a vehicle width direction of the vehicle body (20) in addition to the left and right wheels (22L, 22R).

In the first and second exemplary embodiments described above, the drive unit is configured by the motors 32L, 32R; however, the drive unit that drives the wheels may be a drive unit other than a motor.

As a modified example of the first and second exemplary embodiments described above, the acceleration detection unit may be an acceleration sensor that detects acceleration of the towing vehicle (12) without using the detection results of the wheel speed sensors (34L, 34R). As a modified example of the first and second exemplary embodiments described above, the drive force detection unit may detect the drive force of the towing vehicle (12) without using the detection results of the torque sensors (36L, 36R).

In the first and second exemplary embodiments described above, a yaw moment of inertia estimation unit 504 is provided; however, a configuration without this kind of yaw moment of inertia estimation unit 504 may be adopted.

Further, the respective processing executed by the CPU 50A illustrated in FIG. 3 reading and executing software (a program) in the above-described exemplary embodiments may be executed by various types of processor other than a CPU. Such processors include programmable logic devices (PLD) that allow circuit configuration to be modified post-manufacture, such as a field-programmable gate array (FPGA), and dedicated electric circuits, these being processors including a circuit configuration custom-designed to execute specific processing, such as an application specific integrated circuit (ASIC). Further, the respective processing may be executed by any one of these various types of processor, or by a combination of two or more of the same type or different types of processor (such as plural FPGAs, or a combination of a CPU and an FPGA). The hardware structure of these various types of processors is more specifically an electric circuit combining circuit elements such as semiconductor elements.

The program explained in the foregoing exemplary embodiments may be provided in a format stored on a non-transitory storage medium such as compact disc read only memory (CD-ROM), digital versatile disc read only memory (DVD-ROM), or universal serial bus (USB) memory. Further, the programs may be provided in a format downloadable from an external device over a network.

The foregoing exemplary embodiments and modified examples may be implemented in appropriate combinations.

Although examples of the present disclosure have been described above, the present disclosure is not limited to the foregoing description, and it will be evident that various other modifications may be implemented within a range not departing from the spirit of the present disclosure.

What is claimed is:

1. A device for a towing vehicle, comprising:
   a drive unit configured to independently drive each of left and right wheels of a towing vehicle that tows a towed vehicle;
   an acceleration detection unit configured to detect an acceleration of the towing vehicle;
   a drive force detection unit configured to detect a drive force of the towing vehicle;
   a mass estimation unit configured to estimate a mass of the towed vehicle using respective detection results generated by the acceleration detection unit and the drive force detection unit at a time of acceleration of the towing vehicle in a towing state; and a control unit configured to control a drive force of the left and right wheels of the towing vehicle in consideration of an influence of the mass of the towed vehicle estimated by the mass estimation unit at a time of turning of the towing vehicle in the towing state.

2. The device for a towing vehicle of claim 1, further comprising:
a wheel speed sensor configured to detect respective wheel speeds of the towing vehicle; and
a torque sensor configured to detect torque of the respective wheels of the towing vehicle, wherein:
the drive unit is configured as a motor,
the acceleration detection unit detects the acceleration of the towing vehicle using a detection result of the wheel speed sensor, and
the drive force detection unit detects the drive force of the towing vehicle using a detection result of the torque sensor.

3. The device for a towing vehicle of claim 2, further comprising:
a yaw moment of inertia estimation unit configured to estimate a yaw moment of inertia of the towing vehicle in the towing state using respective detection results generated by the wheel speed sensor and the torque sensor when the towing vehicle in the towing state begins to turn,
wherein the control unit further controls the drive force of the left and right wheels of the towing vehicle in consideration of an influence of the yaw moment of inertia estimated by the yaw moment of inertia estimation unit at a time of turning of the towing vehicle in the towing state.

4. A method of controlling a device for a towing vehicle, the method comprising:
providing a device for a towing vehicle, the device comprising:
a drive unit configured to independently drive each of left and right wheels of a towing vehicle that tows a towed vehicle,
an acceleration detection unit configured to detect an acceleration of the towing vehicle, and
a drive force detection unit configured to detect a drive force of the towing vehicle;
estimating a mass of the towed vehicle using respective detection results generated by the acceleration detection unit and the drive force detection unit at a time of acceleration of the towing vehicle in a towing state; and
controlling a drive force of the left and right wheels of the towing vehicle in consideration of an influence of the estimated mass of the towed vehicle at a time of turning of the towing vehicle in the towing state.

* * * * *